(12) United States Patent
Majumder

(10) Patent No.: US 12,354,301 B2
(45) Date of Patent: Jul. 8, 2025

(54) ABNORMALITY HANDLING DATA AGGREGATING SYSTEM, ABNORMALITY HANDLING DATA AGGREGATING METHOD, AND STORAGE MEDIUM

(71) Applicant: KONICA MINOLTA, INC., Tokyo (JP)

(72) Inventor: Tanmoy Majumder, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 532 days.

(21) Appl. No.: 17/404,013

(22) Filed: Aug. 17, 2021

(65) Prior Publication Data
US 2022/0067957 A1    Mar. 3, 2022

(30) Foreign Application Priority Data

Aug. 26, 2020  (JP) ................... 2020-142544

(51) Int. Cl.
*G06T 7/73* (2017.01)
*G06T 7/00* (2017.01)
*G06T 7/90* (2017.01)

(52) U.S. Cl.
CPC .............. *G06T 7/73* (2017.01); *G06T 7/0002* (2013.01); *G06T 7/90* (2017.01)

(58) Field of Classification Search
CPC ............. H04N 1/0005; H04N 1/00029; H04N 1/00045; H04N 1/00092
See application file for complete search history.

(56) References Cited

U.S. PATENT DOCUMENTS

| 7,773,888 B2 | 8/2010 | Katsumi | |
|---|---|---|---|
| 10,873,719 B2* | 12/2020 | Ohmura | G06T 7/001 |
| 2008/0075488 A1* | 3/2008 | Moriyama | H04N 1/00087 399/43 |
| 2011/0052218 A1* | 3/2011 | Arai | G03G 15/55 399/88 |
| 2011/0110496 A1* | 5/2011 | Foos | A61B 6/563 378/98.5 |
| 2013/0050767 A1* | 2/2013 | Stuart | H04N 1/0044 358/3.26 |

(Continued)

FOREIGN PATENT DOCUMENTS

| JP | 2003110786 A | 4/2003 |
|---|---|---|
| JP | 2008061187 A | 3/2008 |

(Continued)

OTHER PUBLICATIONS

Japanese Office Action (and an English language translation thereof) dated Feb. 27, 2024, issued in counterpart Japanese Application No. 2020-142544.

(Continued)

*Primary Examiner* — Benjamin O Dulaney
(74) *Attorney, Agent, or Firm* — Holtz, Holtz & Volek PC

(57) ABSTRACT

An abnormality handling data aggregating system includes the following. A hardware processor obtains handling information to solve an abnormality of image quality occurring in an image forming apparatus corresponded with abnormality image data regarding an output image including the abnormality of the image quality in the image forming apparatus as abnormality solution data. A storage stores the abnormality solution data which is obtained.

18 Claims, 10 Drawing Sheets

(56) References Cited

U.S. PATENT DOCUMENTS

| | | | | |
|---|---|---|---|---|
| 2013/0148143 A1* | 6/2013 | Ooyanagi | .......... | H04N 1/00015 |
| | | | | 358/1.14 |
| 2013/0265594 A1* | 10/2013 | Liu | .................... | H04N 1/00029 |
| | | | | 358/1.9 |
| 2013/0322701 A1* | 12/2013 | Szymanski | .......... | H04N 1/6036 |
| | | | | 382/112 |
| 2017/0064095 A1* | 3/2017 | Matsuzaki | ......... | H04N 1/00029 |
| 2019/0279345 A1* | 9/2019 | Kim | ....................... | G06V 20/60 |
| 2020/0133182 A1* | 4/2020 | Haik | .................... | G05B 13/027 |
| 2020/0134800 A1* | 4/2020 | Hu | ......................... | G06V 10/25 |
| 2020/0342036 A1* | 10/2020 | Fowlkes | .................. | G06N 7/01 |
| 2020/0344361 A1* | 10/2020 | Nakaiwa | ............ | H04N 1/00334 |
| 2021/0073972 A1* | 3/2021 | Wu | .......................... | G06N 3/08 |
| 2021/0287353 A1* | 9/2021 | Soltwedel | ........ | G01N 21/95607 |
| 2023/0315562 A1* | 10/2023 | Bae | .................... | G06F 11/0793 |
| | | | | 714/40 |

FOREIGN PATENT DOCUMENTS

| | | | |
|---|---|---|---|
| JP | 2009222769 A | 10/2009 |
| JP | 2012078795 A | 4/2012 |
| JP | 2013247658 A | 12/2013 |
| JP | 2020019206 A | 2/2020 |

OTHER PUBLICATIONS

Japanese Office Action (and an English language translation thereof) dated Jul. 16, 2024, issued in counterpart Japanese Application No. 2020-142544.

\* cited by examiner

| | FILE NAME | CREATED DATE/TIME | TARGET IMAGE | DETECTION ABNORMALITY | SOLUTION METHOD | INPUT |
|---|---|---|---|---|---|---|
| 1 | FILE A | 2020-02/... | | | | |
| 2 | FILE B | 20.../02... | | | VIEW | EDIT |
| 3 | FILE C | 2020-02/01 | | | | EDIT |

AUTHORIZATION IS NECESSARY
USER ID: xyz90001
PASSWORD: *********
OK

CANCEL  UPDATE

FIG.4B

SOLUTION REPORT No.xx

SHEET SIZE
SHEET TYPE
PRINTER TYPE
CONTENTS OF PROBLEM
SITE WHERE PROBLEM OCCURRED
SOLUTION PROCEDURE

TONER
ABNORMALLY GENERATED COLOR

IMAGE  IMAGE  IMAGE

PRECAUTION
DIFFICULTY
REPLACEMENT COMPONENT

DETECTED ABNORMALITY

UPDATED HISTORY
2015-5/15 CREATED BY X
2015-5/20 SOLVED BY Y
METHOD EDITED

EXPORT  CANCEL  REGISTER

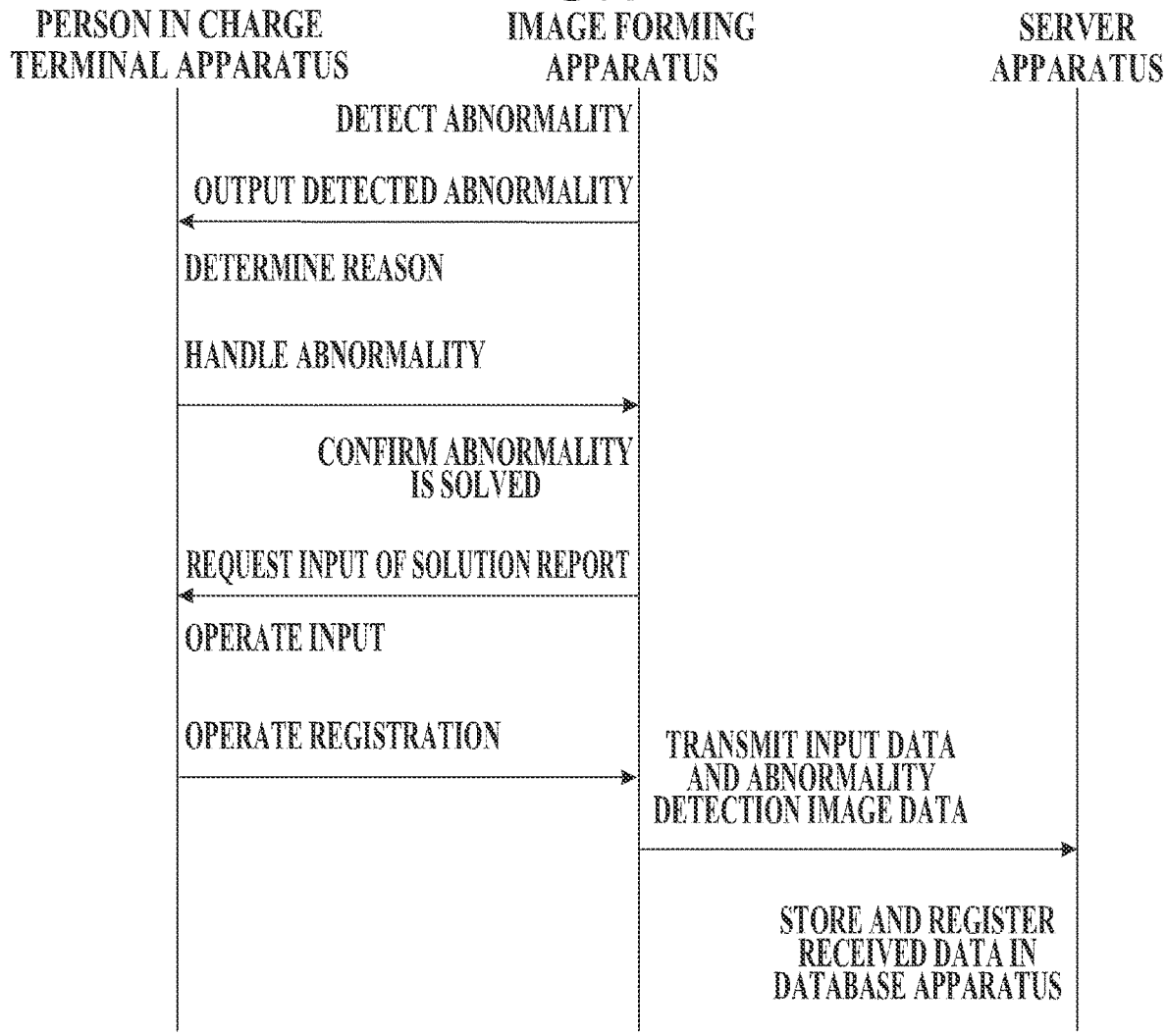
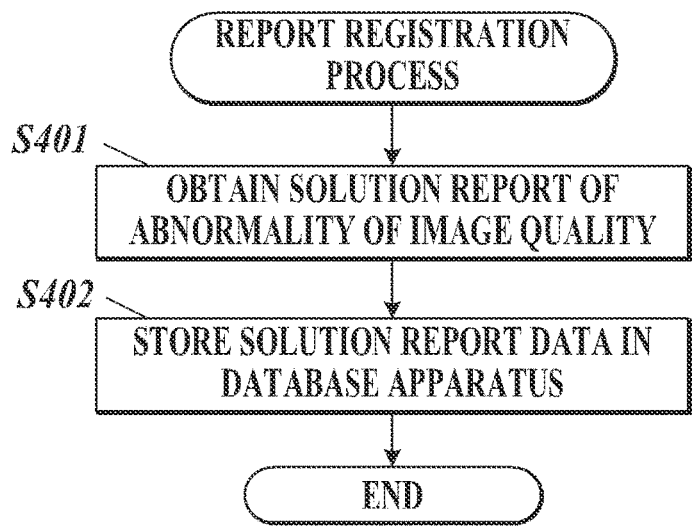

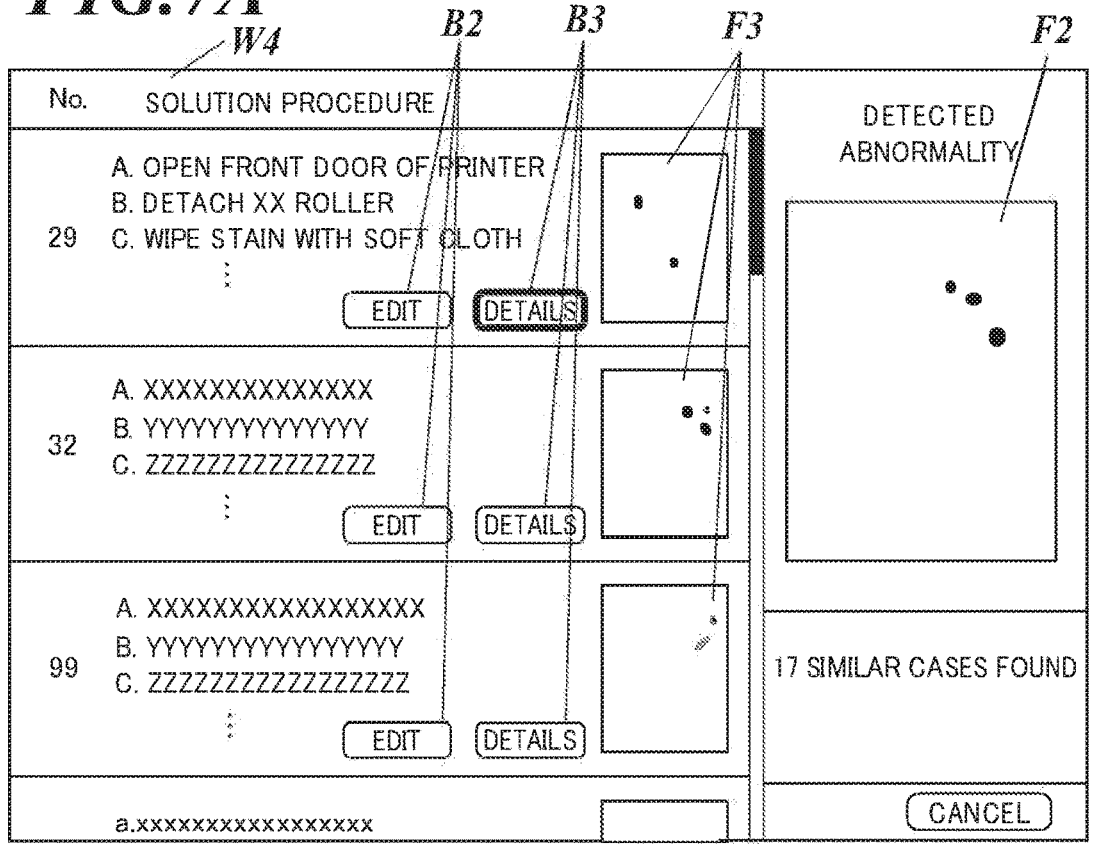

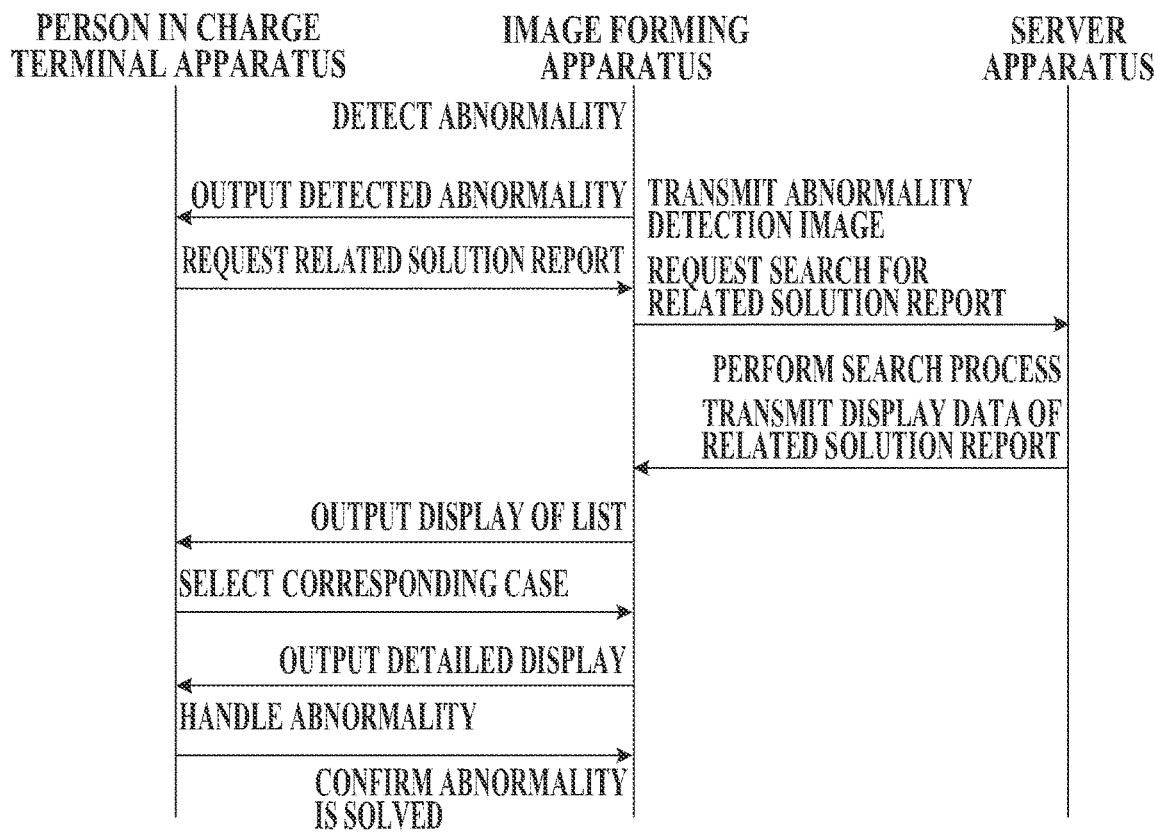
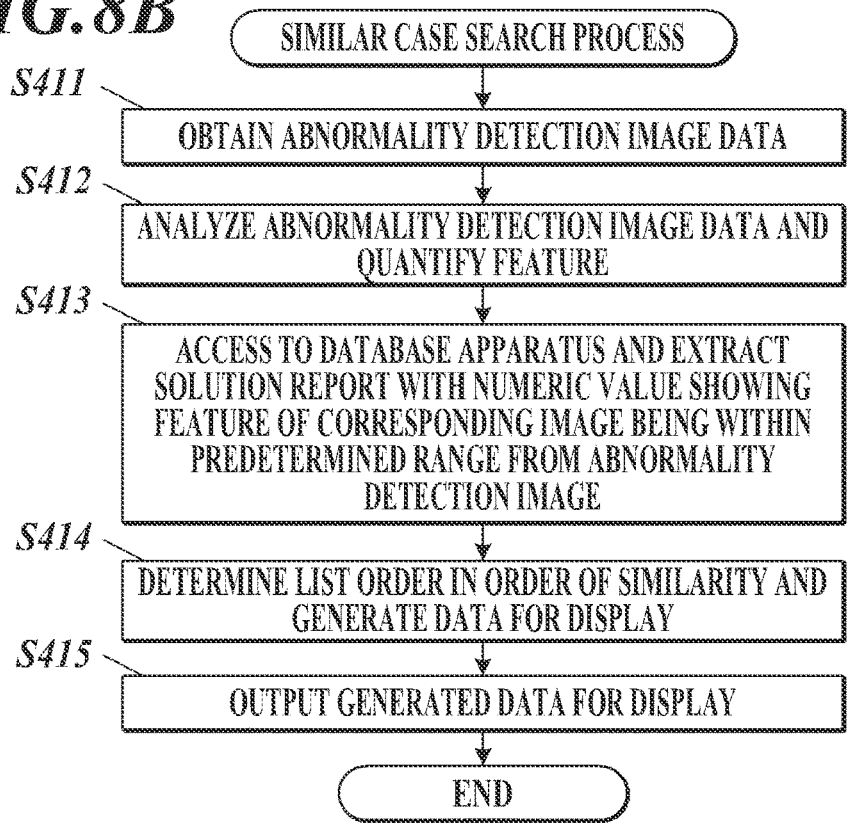

FIG. 9
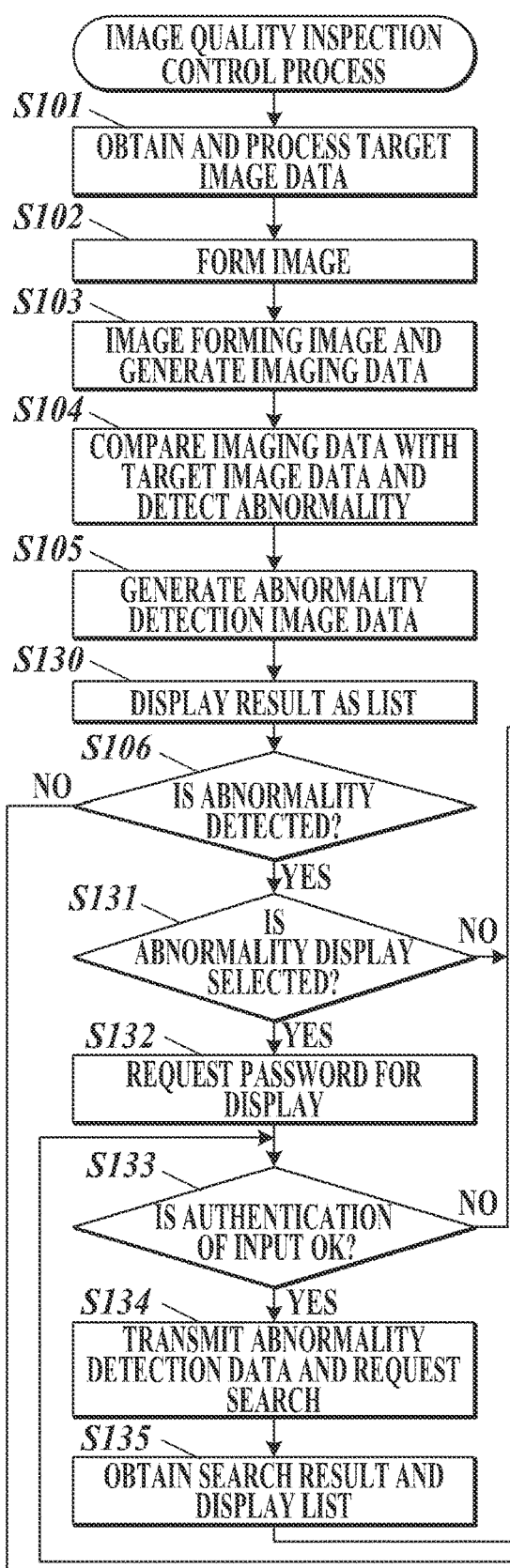
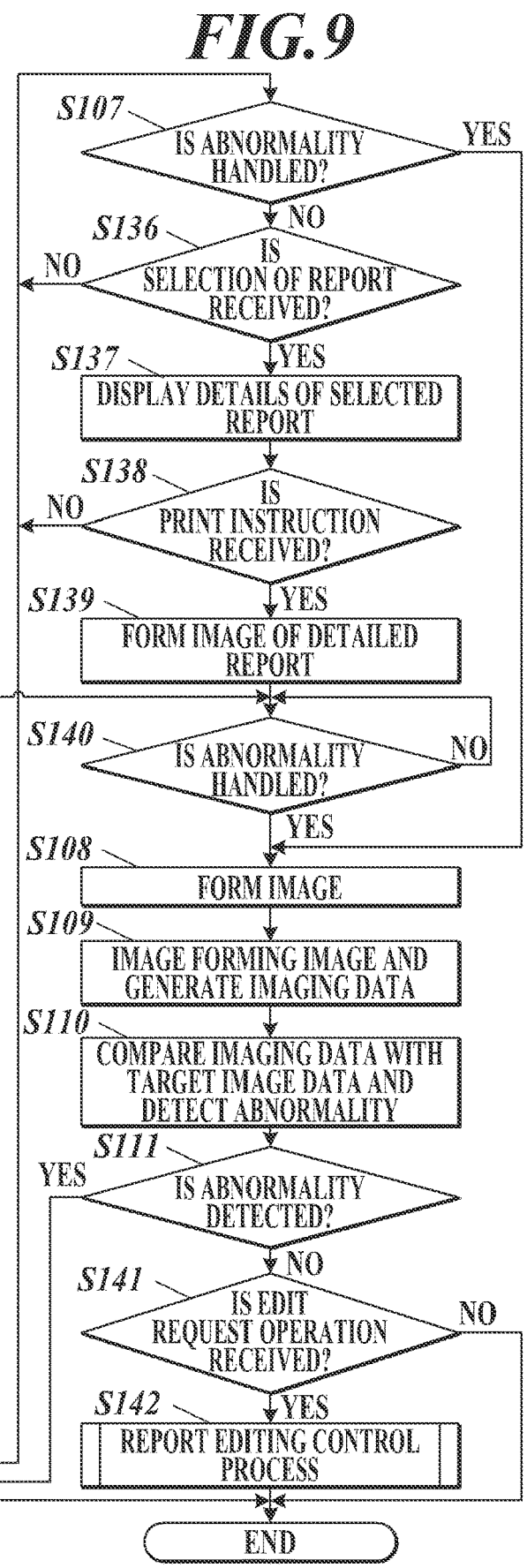

ABNORMALITY HANDLING DATA AGGREGATING SYSTEM, ABNORMALITY HANDLING DATA AGGREGATING METHOD, AND STORAGE MEDIUM

CROSS-REFERENCE TO RELATED APPLICATIONS

The entire disclosure of Japanese Patent Application No 2020-142544 filed on Aug. 26, 2020 is incorporated herein by reference in its entirety.

BACKGROUND

Technological Field

The present invention relates to an abnormality handling data aggregating system, an abnormality handling data aggregating method, and storage medium.

Description of the Related Art

There is an image forming apparatus in which color material is applied to the recording medium and various images are formed. According to such image forming apparatus, when there is an abnormality in any of the units, it may become difficult to form an image with normal image quality. In such case, the user, manager of the image forming apparatus, or maintenance vendor may need to determine the reason of the abnormality and handle the abnormality. JP 2009-222769 describes displaying the reason of the abnormality of the image quality and the method of maintenance on a display of the image forming apparatus in order to make the handling of the abnormality easier.

SUMMARY

However, the reason and contents of the abnormality vary, and it may be difficult to handle the abnormality depending on the experience and knowledge of the person handling the abnormality. Further, it may not be possible to find the reason. Due to the above, there is a problem that a long amount of time and a burden is necessary until, in the end, the determination and result of handling can be obtained by a person who has sufficient knowledge and experience.

The purpose of the present invention is to provide an abnormality handling data aggregating system, an abnormality handling data aggregating method and storage medium in order to easily obtain a solution to solve the abnormality of the image quality speedily and without burden.

To achieve at least one of the abovementioned objects, according to an aspect of the present invention, an abnormality handling data aggregating system reflecting one aspect of the present invention is shown, the apparatus including, a hardware processor which obtains handling information to solve an abnormality of image quality occurring in an image forming apparatus corresponded with abnormality image data regarding an output image including the abnormality of the image quality in the image forming apparatus as abnormality solution data; and a storage which stores the abnormality solution data which is obtained.

According to another aspect, an abnormality handling data aggregating method including: obtaining handling information to solve an abnormality of image quality occurring in an image forming apparatus corresponded with abnormality image data regarding an output image including the abnormality of the image quality in the image forming apparatus as abnormality solution data; and storing the abnormality solution data which is obtained.

According to another aspect, anon-transitory computer-readable storage medium storing a program causing a computer to perform, obtaining handling information to solve an abnormality of image quality occurring in an image forming apparatus corresponded with abnormality image data regarding an output image including the abnormality of the image quality in the image forming apparatus as abnormality solution data; and storing the abnormality solution data which is obtained.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 3 is a diagram showing an example of a display screen showing a status of detection of abnormalities displayed as a list on the display of the image forming apparatus;

FIG. 4A and FIG. 4B are diagrams showing an example of a display of an input screen of a solution report;

FIG. 5A and FIG. 5B are diagrams showing a flow of a process up to registering a solution report when an abnormality is solved;

FIG. 7A and FIG. 7B are diagrams describing a display of the solution report;

FIG. 8A and FIG. 8B are diagrams describing a display of a similar case when an abnormality of the image quality occurs in the image forming apparatus;

FIG. 9 is a flowchart showing another example of a control procedure of an image quality inspection control process.

DETAILED DESCRIPTION OF EMBODIMENTS

Hereinafter, one or more embodiments of the present invention will be described with reference to the drawings. However, the scope of the invention is not limited to the disclosed embodiments.

Below, an embodiment of the present invention is described with reference to the drawings.

Figure 1:
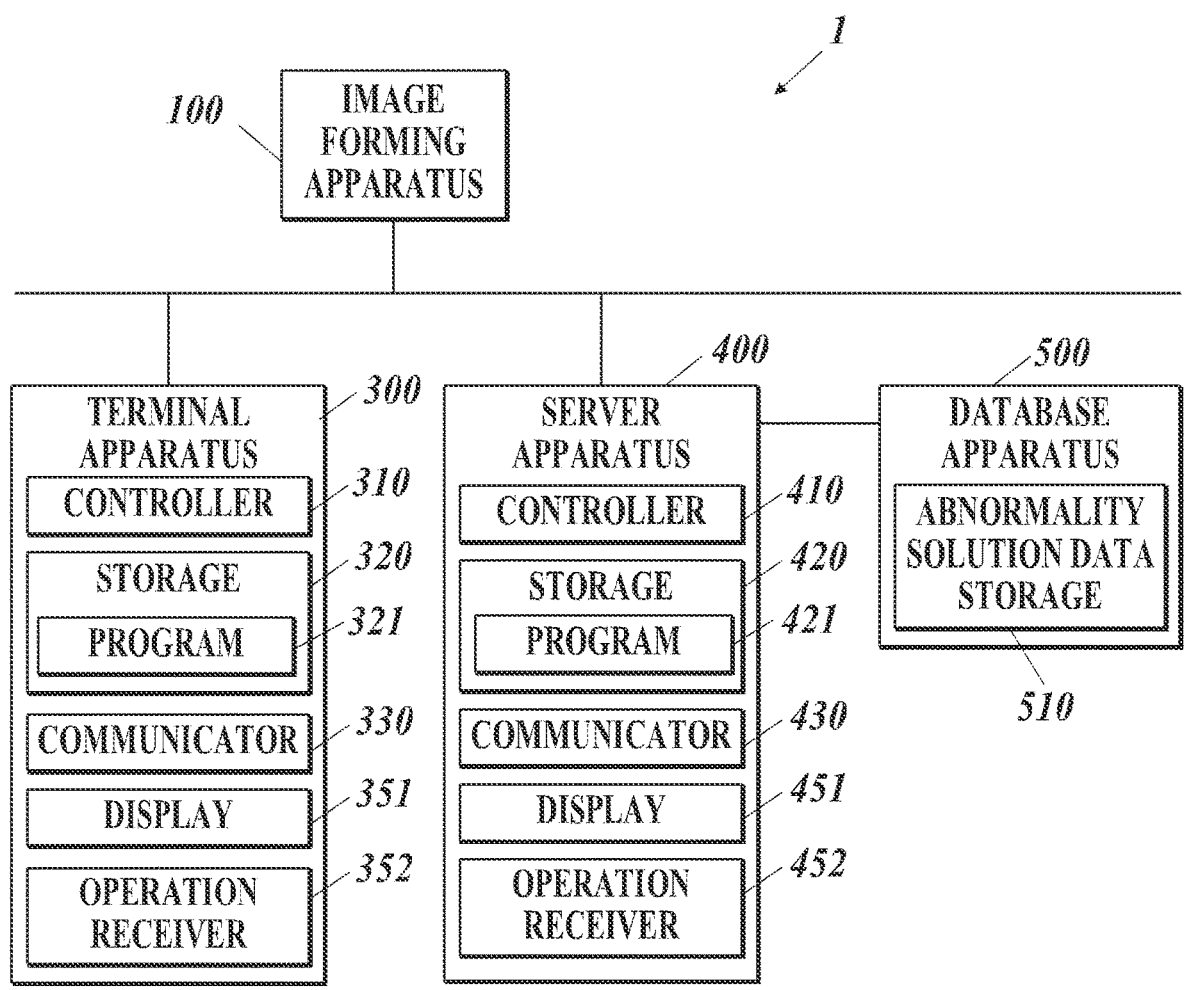
FIG. 1 is a diagram showing a configuration of an image forming system.

FIG. 1 is a diagram showing a configuration of an image forming system 1 which is an abnormality handling data aggregating system according to the present embodiment.

The image forming system 1 includes an image forming apparatus 100, a terminal apparatus 200 and 300, a server apparatus 400, and a database apparatus 500, and the above are connected to be able to communicate with each other through a network. Based on the image data which is the target of forming, the image forming apparatus 100 performs the operation to form the image on the medium. The image data which is the target of forming can be obtained from outside, or can be data read and generated in the apparatus. That is, the image forming apparatus 100 may include a copying function. The terminal apparatus 200 may be a PC (Personal Computer) which outputs to the image forming apparatus 100 an instruction as job data (image forming instruction) so that the image forming apparatus 100 forms an image. The job data may include one or all of the following, image data which is a target of forming, various setting regarding forming the image such as output size, output direction, number of output sheets, whether the color image is formed, and selected data of various image forming modes set in advance. The image data of the forming target is not directly included in the job data, and may be specified by a pointer or a link. There may be a plurality of image forming apparatuses 100 and terminal apparatuses 200 for each of the server apparatus 400 and the database apparatus 500.

The terminal apparatus 300 can be carried by the person who is in charge of maintenance and who specializes in the maintenance of the image forming apparatus 100, and may be, a note PC, a tablet terminal, a smartphone, or the like, for example. The terminal apparatus 300 may include various PCs to which the person in charge of maintenance can access from a workplace or from home. The terminal apparatus 300 includes a controller 310, a storage 320, a communicator 330, a display 351, and an operation receiver 352. The controller 310 includes a CPU (Central Processing Unit, hardware processor), a RAM (Random Access Memory), and the like. The controller 310 centrally controls the entire operation of the terminal apparatus 300. The storage 320 stores the program 321 and various setting data. The program 321 includes a program which accesses to the server apparatus 400 and performs transmitting and receiving of data regarding the abnormality of the image quality in the image forming of the image forming apparatus 100. The communicator 330 performs communication with the external device and controls the communication. For example, the communicator 330 controls the communication according to a communication standard regarding a wireless LAN. The display 351 includes a display screen in which an image including letters can be displayed, and performs various display based on the control by the controller 310. For example, the display screen is a liquid crystal display screen. The operation receiver 352 receives an external input operation from the user and outputs the signal as an input signal to the controller 310. The operation receiver 352 includes, a keyboard, various pointing devices and/or a touch panel positioned to be overlapped on the display screen.

The server apparatus 400 obtains from outside data of a solution report (handling information) generated when the image quality abnormality occurring in the image forming apparatus 100 is solved and abnormality detection image data (abnormal image data) regarding the image formed including the image quality abnormality. These are corresponded as abnormality solution data and stored in the database apparatus 500. The server apparatus 400 searches for a registered solution report which is similar based on the abnormality detection image data and outputs the search information.

For example, the server apparatus 400 may be a normal PC (computer which executes a program). The server apparatus 400 includes a controller 410, a storage 420, a communicator 430, a display 451, and an operation receiver 452. The controller 410 includes a CPU (Central Processing Unit, hardware processor) and a RAM (Random Access Memory). The controller 410 centrally controls the entire operation of the server apparatus 400. The storage 420 stores a program 421 and various setting data. The program 421 includes a program which accesses to the image forming apparatus 100 and the terminal apparatus 300 and transmits and receives data regarding the abnormality of the image quality in the image forming by the image forming apparatus 100. The communicator 430 performs communication with the external device and controls the communication. For example, the communicator 430 controls the communication according to a communication standard regarding a wireless LAN. The display 451 includes a display screen in which an image including letters can be displayed, and performs various display based on the control by the controller 410. For example, the display screen is a liquid crystal display screen. The operation receiver 452 receives an external input operation from the user and outputs the signal as an input signal to the controller 410. The operation receiver 452 includes, a keyboard, various pointing devices such as a mouse, and the like.

The database apparatus 500 includes an abnormality solution data storage 510 (storage). The abnormality solution data input from the server apparatus 400 is stored in the abnormality solution data storage 510.

Figure 2:
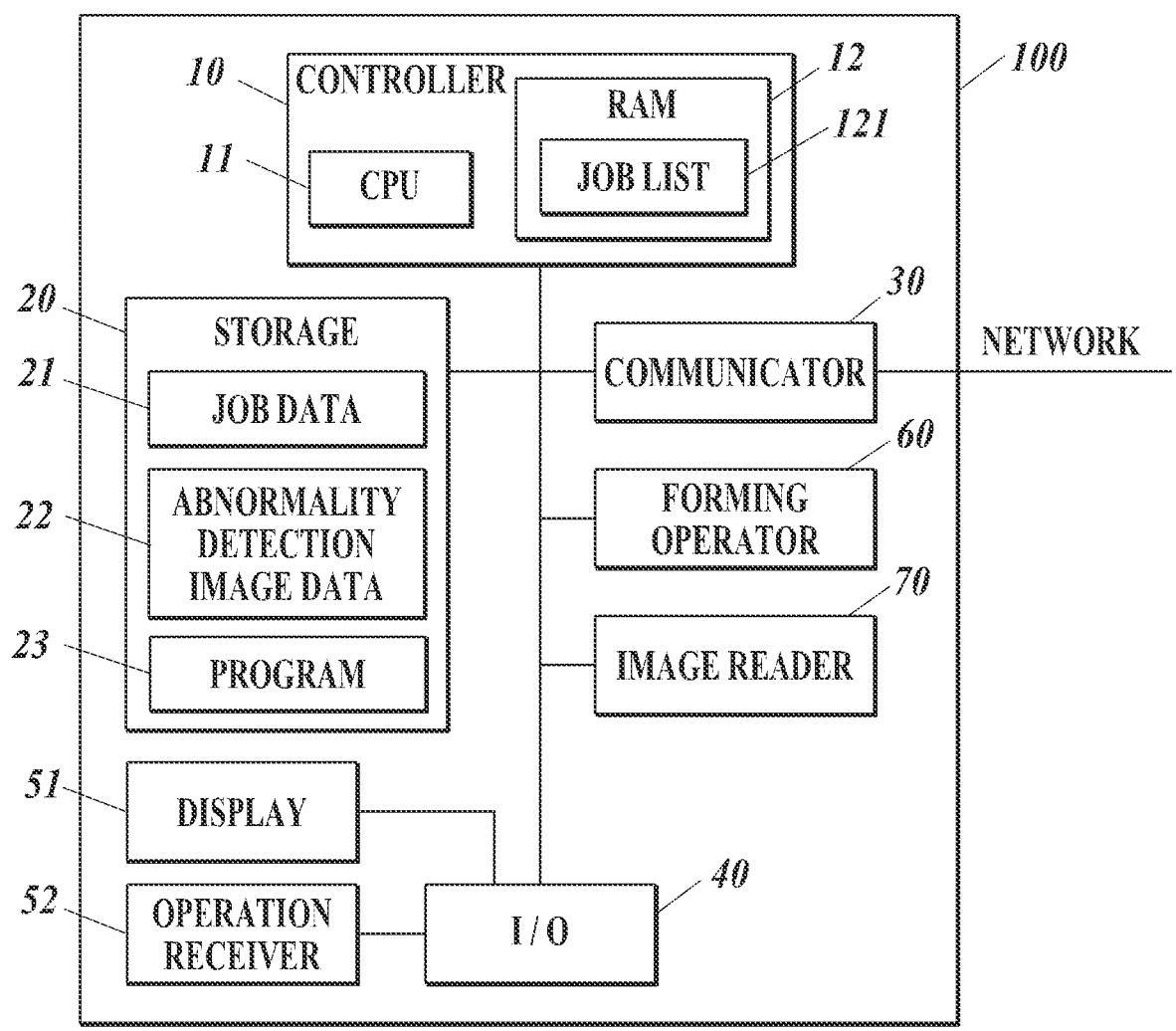
FIG. 2 is a block diagram showing a functional configuration of an image forming apparatus.

FIG. 2 is a block diagram showing a functional configuration of an image forming apparatus 100.

The image forming apparatus 100 includes a controller 10, a storage 20, a communicator 30, an input/output interface 40 (I/O), a display 51, an operation receiver 52, a forming operator 60, and an image reader 70.

The controller 10 is a controller which centrally controls the entire operation of the image forming apparatus 100. The controller 10 includes a CPU 11 (Central Processing Unit, hardware processor) and a RAM 12 (Random Access Memory). The CPU 11 performs various calculating processes. The RAM 12 provides a memory space for work to the CPU 11 and stores temporary data. For example, the RAM 12 stores a job list 121. The controller 10 performs an image forming operation in order according to the job list 121 and performs the process regarding the detection of abnormalities regarding the image forming and displaying of the detection result.

For example, the storage 20 includes a volatile memory (DRAM) which stores temporary data with a large amount, and a nonvolatile memory and/or HDD (Hard Disk Drive) which stores generating data, setting data, and a program 23 which is maintained regardless of the state of supplying electric power. The nonvolatile memory may include a flash memory (including SSD (Solid State Drive)), for example. For example, the temporary data may include the job data 21 regarding forming the images and the processing data regarding the above. For example, the generated data includes abnormality detection image data 22 and the original imaging data of the output image. The program 23 includes a program so that the controller 10 executes and controls the later-described image forming control process.

The communicator 30 controls the transmitting and receiving of data through the network with external devices. The communicator 30 includes a network card which performs control operation of the transmitting and receiving of data according to a predetermined communication standard such as a protocol of TCP/IP, etc.

The input/output interface 40 is an interface to connect to surrounding devices and to perform transmitting and receiving of data. For example, the input/output interface 40 includes a USB terminal and is able to transmit and receive data according to a corresponding communication standard.

Here, the display 51 and the operation receiver 52 are connected to the input/output interface 40. Based on the control by the controller 10, the display 51 includes a display screen which displays a status and menu regarding the image forming operation and predetermined notification contents. The display 51 may include an LED lamp in order to perform the predetermined notification operation. The operation receiver 52 receives the input operation from outside such as the user, and outputs the signal as an input signal to the controller 10. The operation receiver 52 includes some or all of the following, a touch panel positioned to be overlapped on the display screen, a press button switch, a lock switch, a slide switch, numeric keys, and a keyboard.

The forming operator 60 performs the operation to form an image (output image) on a recording medium (medium) based on image data as a target of forming specified in the job data 21. Although not limited, the forming operator 60 performs the operation to attach and fix toner on the recording medium conveyed at a predetermined speed according to an electro-photographic method. Although not limited, the recording medium may be various printing sheets, and the operation of the forming operator 60 can be adjusted according to the thickness and whether there is coating.

The image reader 70 images the surface of the recording medium and generates the imaging data. For example, the image reader 70 includes a line sensor which performs imaging in colors of RGB. The image reader 70 sequentially images the surface of the conveyed recording media which passed the image forming operation position in which the image is formed by the forming operator 60. With this, the secondary image data (imaging data) is generated. When the image is formed on the surface of the recording medium by the forming operator 60, the imaging data of the formed image is obtained.

Next, the abnormality detection operation of the formed image performed in the image forming apparatus 100 according to the present embodiment is described. In the image forming apparatus 100, when the image forming is performed by the forming operator 60 based on the target image data according to the predetermined instruction, the formed image is read by the image reader 70 and the imaging data is generated. Then, based on the difference between the target image data and the imaging data, the abnormality portion occurring when the image forming operation is performed is detected and specified from the imaging data. For example, the abnormality may be unsuitable attaching of the color material (abnormal attaching occurring due to impurities, stain or missing areas occurring in response to abnormality in operation of the forming operator 60), local stain by the conveying roller which moves the recording medium, and separating due to failure in fixing. In order to detect the above difference, the process to format the target image data and to suitably match the resolution to the imaging data can be performed. Only the abnormality portion detected in the imaging data (image quality abnormality detected portion) (here, "only" may include a surrounding region at a fine width considering detection accuracy) is extracted, and abnormality detection image data 22 which shows a position where the abnormality occurred is generated.

Figure 3:
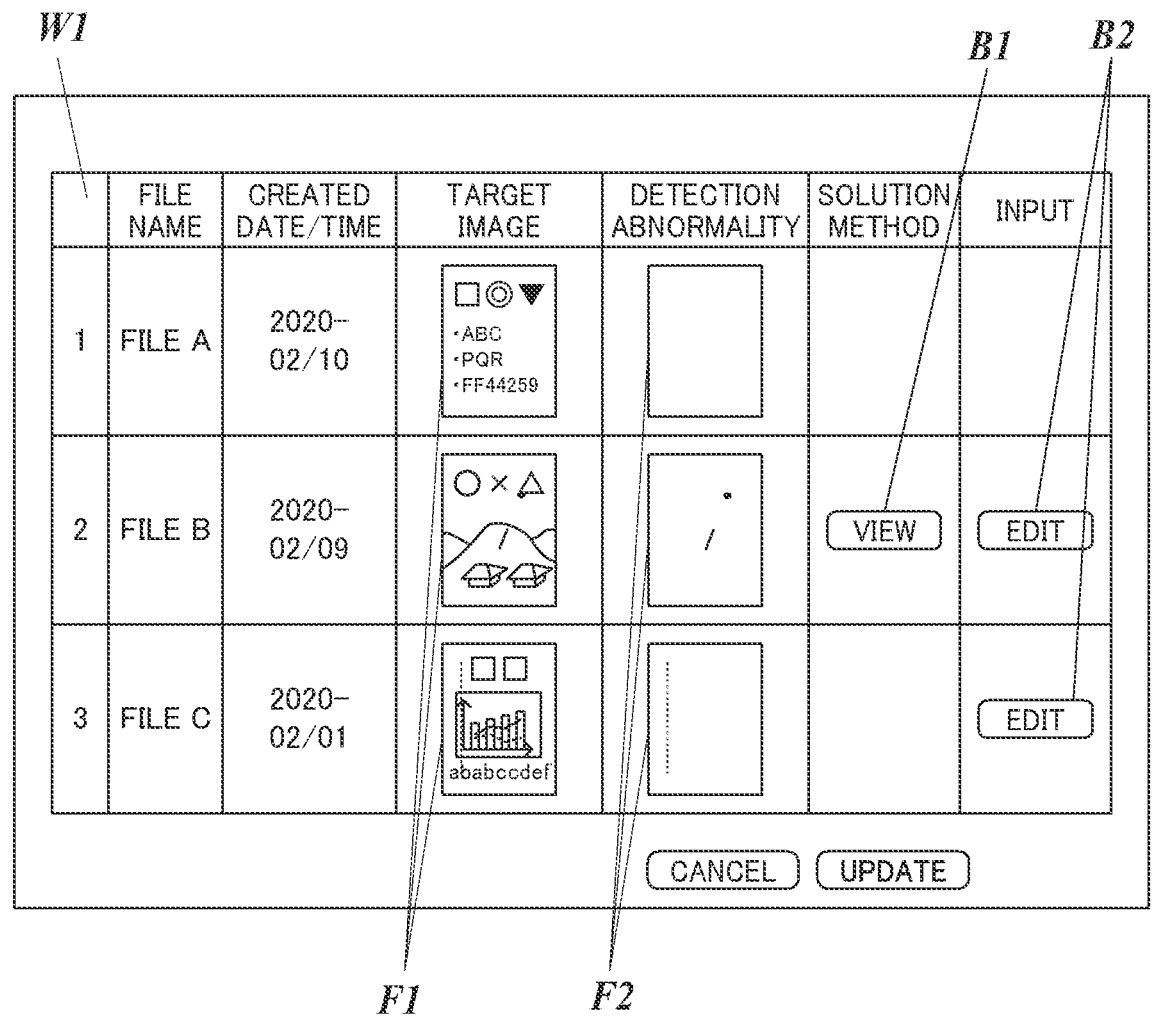

FIG. 3 is a diagram showing an example of a display screen W1 displaying a state of detecting abnormalities displayed as a list on the display 51 of the image forming apparatus 100.

For example, the display screen W1 in the display as a list shows the abnormality detection state for three images. By associating with the file name and the date/time that the image is formed (that is, date/time that the imaging data and the abnormality detection image data 22 are formed), the imaging image F1 and the abnormality detection image F2 are displayed aligned so that the images can be easily compared. Here, the abnormality in file A is not detected and the entire abnormality detection image is white. In file B and file C, the abnormality detected from the imaging image is extracted and the abnormality is shown in the abnormality detection image. Regarding file B, a black dot and line are shown, and in file C, a vertical streak is shown.

In the display screen W1, in addition to the column displaying the above images, a column displaying a solution and the column displaying input are shown. An operation button B1 displaying "view" is shown in the solution method column and an operation button B2 displaying "edit" is shown in the input column.

The solution column is for viewing the method to solve the abnormality when the abnormality is detected. Therefore, when the abnormality is not detected as in file A, the solution is not displayed. Here, an operation button B1 is not displayed for the file C also although the abnormality is detected. When the solution for the related abnormality is not registered, the operation button B1 does not have to be displayed. As described later, if the solution is actually searched after the operation button B1 is selected and operated, there is no need to determine whether the solution exists and the operation button B1 does not have to be uniformly displayed when the display screen W1 is displayed.

The column for input is for newly inputting the solution for the detected abnormality or for additional comments or correction of the solution which is already input. Therefore, when the abnormality is not detected as in the file A, the operation button B2 showing "edit" is not displayed.

Next, the process to solve the abnormality of the image quality is described.

As described above, the abnormality of the hardware in the image forming apparatus 100 tends to influence the abnormality of the image quality. In order to solve the above, processes to handle the abnormality such as maintenance processes and replacement of components performed manually are necessary. In order to handle the abnormality, it is necessary to determine the contents of the maintenance to be performed from the abnormality contents of the image quality. The contents of the maintenance to be performed vary from those which can be easily performed by a typical user of the image forming apparatus 100 to those which need a certain degree of expertise and technique.

There is a wide variety in the amount of knowledge and technique that each person has to determine the maintenance contents from the contents of the abnormality of the image quality depending on whether the person is a normal user of the image forming apparatus 10 or a manager, or a maintenance vendor who is new or who is skilled. The burden on the small number of those with a large amount of knowledge is heavy if an inquiry is made to such person each time. According to the image forming system 1 of the present embodiment, when the maintenance vendor (specifically, it is possible to limit to some who are skilled and have a large amount of knowledge) solves an abnormality in the image forming apparatus 100, a request is made to the person who handled the abnormality to input a report (solution report) regarding the solution. The input solution report is obtained by the server apparatus 400 associated with the abnormality detection image data, and the data is aggregated and stored in the database apparatus 500. Then, when the image quality abnormality occurs in the image forming apparatus 100, the normal user, the manager, the person in charge of reception for assistance of the maintenance company and the inexperienced person performing maintenance can search the report so as to be able to obtain knowledge of the suitable procedure to solve the abnormality.

FIG. 4A and FIG. 4B are diagrams showing a display example of the input screen for the solution report.

As shown in FIG. 4A, when the operation button B2 is selected and operated on the display screen W1, first, an authentication screen W2 is displayed and an authentication is performed to determine whether the person is suitable for inputting the report. With this, it is possible to avoid input of data with low quality.

As shown in FIG. 4B, when the authentication of the person suitable for input is performed, an input screen W3 for the solution report is displayed, and various items set in advance can be input. When the input screen W3 is displayed on the display screen of the image forming apparatus 100, and it is difficult for the person in charge of maintenance to obtain sufficient amount of time for input, only the corresponding between the number of the report (identification information) and the abnormality detection image data can be performed according to the predetermined storage process, and the input of the other items can be performed later from a different terminal apparatus 300 based on the identification information of the report. When the identification information is applied in the server apparatus 400 separately from the image forming apparatus 100, the number of the report does not have to be displayed in the original input column.

For example, the input items of the solution report includes, sheet size, sheet type, toner type, abnormally generated color, printer type, contents of problem (description regarding problem), site in which problem occurred, solution procedure (process procedure), precautions, difficulty, replacement component. The sheet size may include, in addition to normal A-type and B-type, modified sizes such as postcard size and envelope size. The sheet type may include, in addition to normal sheet, high quality sheet, and coated sheet, the sheet type classified by the purpose of use such as back side of a used sheet. The above, and the toner type, abnormally generated color, printer type, etc. are not always reasons specific to abnormalities that occur, and the above information may be reference information.

Regarding the contents of the problem and the site in which the problem occurs, the contents of the result of the determination and the solution determined to be final are recorded. That is, when the result of the original determination is mistaken, the contents and the site which are understood to be correct in the end are recorded. When the abnormality is solved by trial and error but the reason of the abnormality is not clear, the report does not have to be created.

The method to describe the solution procedure is not limited, and can be shown by writing items for each processing step. Images such as pictures of the target position can be added to the solution procedure. As described above, the upload of the image data can be performed separately after the other processes. The image data does not have to be the data when handling the abnormality of the image quality, and some or all of the image data may be image data imaged later or for a different purpose using an image forming apparatus which operates normally.

The precautions can be described based on the opinion of the person in charge of recording, and may include points where there may be a wrong outcome even if the procedure is performed properly, points where mistakes tend to occur, and tools necessary in the operation, for example. If there is nothing to be noted, the precautions may be left blank, or "none" may be written.

Difficulty shows the level of the person who can handle the abnormality based on the amount of knowledge and the amount of techniques. Here, this item is optional, but for example, the difficulty can be selected by a pull-down menu from options set in advance. Alternatively, the relation can be set clearly in advance such as "easy" meaning that the abnormality can be handled by a normal user, and "difficult" can only be handled by a skilled person. With this, this item can be completed by only writing "easy", "difficult", and the like.

Replacement component shows the component which is actually replaced when handling the abnormality. When there are no replacement components, this item may be left blank, or "none" may be written.

In the input screen W3, the updated history is displayed in the lower right. When a solution procedure more efficient than the original solution procedure is found or there are precautions found when handling the abnormality by referring to the report, by being able to add information, it is possible to prevent the information from becoming outdated and the useless data remaining. In this case, the previously described contents are also described in the input screen. When such contents are erased by another person without permission, this may cause trouble. Therefore, the information is added and the history is displayed so that the person who updated the information can be specified. Alternatively, the setting can be made so that the person other than the person who wrote the previous information cannot erase the registered contents.

When the operation button B31 displaying "register" positioned at the bottom of the input screen W3 is selected and operated, the input contents are transmitted to the server apparatus 400 and registered. When the operation button B32 displaying "cancel" is selected and operated, the input contents are erased, and the information is not transmitted and registered to the server apparatus 40. When the operation button B33 displaying "export" positioned at the bottom left is selected and operated, the data including the contents being input at present is converted to a file in a predetermined format such as document data or PDF data and the data is output. The conversion process of the file format can be performed in the image forming apparatus 100 (or terminal apparatus 300), but alternatively, the process can be requested to the server apparatus 400 and performed in the server apparatus 400. In this case also, there is no need to hold the data in the middle of input in the server apparatus 400 after the conversion process.

The output file can be opened to be able to edit again in the terminal apparatus 300, and the file can be transmitted to the server apparatus 400 after editing. With this, for example, the person in charge of solving the abnormality may input right after solving the abnormality of the image quality a simple memo so as not to forget the solution, and may write a suitable document after settling down later on or may add image data depending on the situation. According to such input, in the end, it is possible to register a solution report which is easy to read, and this may be useful when searched and viewed later on.

In order to edit an exported file, a dedicated program (application software) may be necessary, or a general editor may be used to directly edit the output format data.

FIG. 5A and FIG. 5B are diagrams showing a flow of a process to register a solution report when the abnormality is solved. The process by the person in charge on the left side includes when the person in charge confirms the display contents on the image forming apparatus by sight and directly handles the situation or the person in charge obtains output or performs input through a terminal apparatus at hand.

As shown in the sequence diagram shown in FIG. 5A, when the abnormality of the image quality is detected in the image forming apparatus 100, the information showing that the image quality abnormality is detected in the image forming apparatus 100 is displayed on the display. The display is not limited to the display 51 of the image forming apparatus 100 and may be the display of the terminal apparatus 300. The display may be possible in both displays at the same time. The terminal apparatus 300 may be able to directly access to the image forming apparatus 100 or the terminal apparatus 300 may access to the server apparatus 400 and indirectly request information regarding the image quality abnormality of the image forming apparatus 100. In the latter situation, the server apparatus 400 obtains the information regarding the abnormality of the image forming apparatus 100. Then, the terminal apparatus 300 obtains the information regarding the abnormality of the image quality from the server apparatus 400, and the terminal apparatus 300 displays the information on the display 351.

The person in charge determines the reason for the abnormality based on the displayed abnormality detection image and suitably handles the reason of the abnormality. As a result of handling the abnormality, if it is confirmed that the abnormality is solved in the image forming apparatus, an input of a solution report is requested from the image forming apparatus 100. If the person in charge performs the input in response to the request and performs the registration operation, and the input and the operation of the registration is performed on the image forming apparatus 100, the image forming apparatus 100 transmits the input data to the server apparatus 400. If the registration operation is performed on the terminal apparatus 300, the input data is directly transmitted from the terminal apparatus 300 to the server apparatus 400.

When the data of the solution report is received, the server apparatus 400 transmits the data to the database apparatus 500 and stores and registers the data in the abnormality solution data storage 510. Identification information (here, number) is applied to the solution report. According to the type of database, the contents of the solution report can be divided into each item and stored according to item so as to be able to reorganize the data later on according to the specific identification information.

FIG. 5B is a flowchart showing a control procedure of a report registration process executed in the server apparatus 400. Such report registration process starts each time the data of the solution report is received from the image forming apparatus 100.

Figure 6:
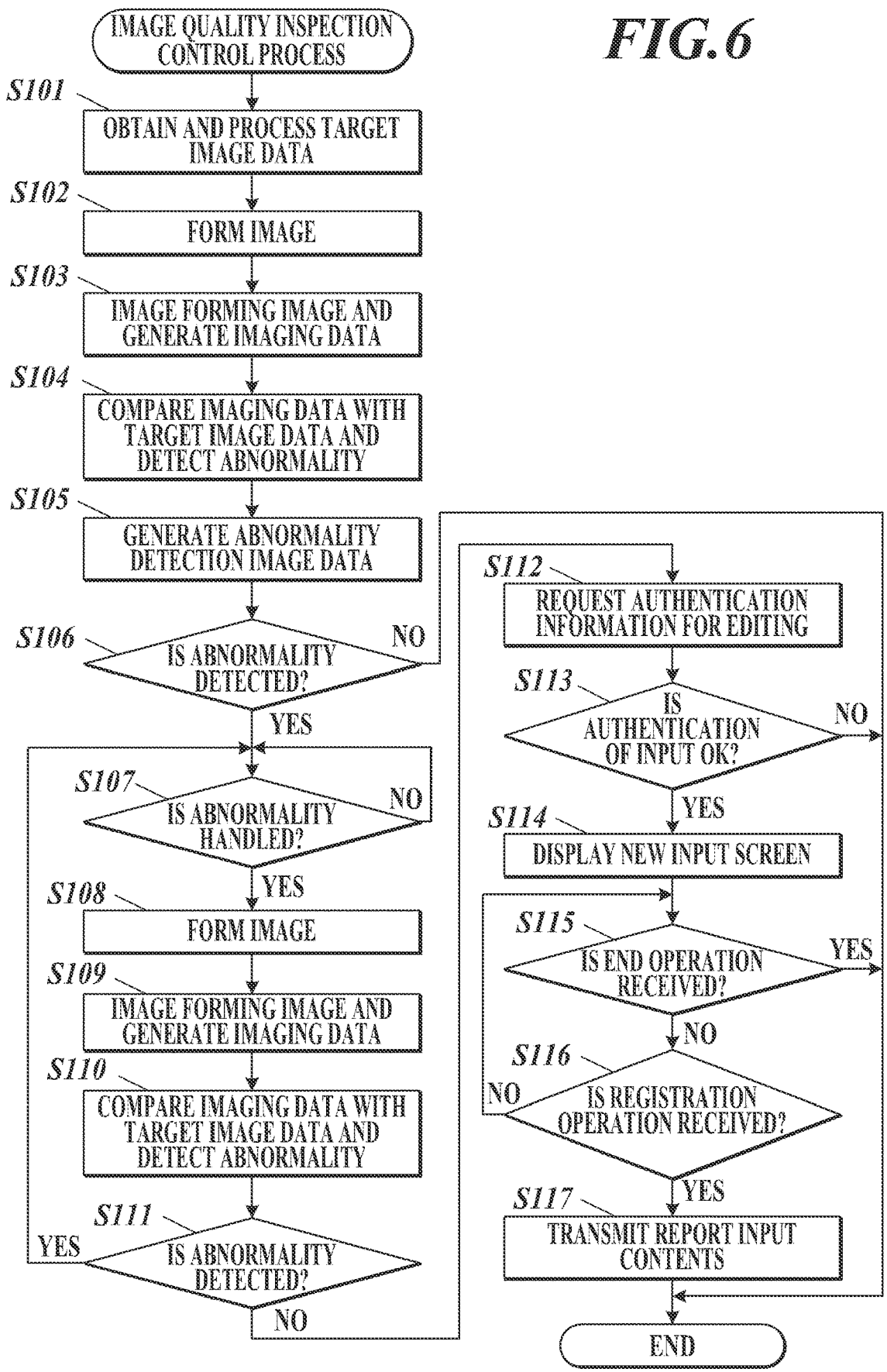
FIG. 6 is a flowchart showing a control procedure of an image quality inspection control process executed by the image forming apparatus.

When the report registration process starts, the controller 410 (CPU) obtains the received data of the solution report (step S401; obtainer, obtaining step). The controller 410 outputs the obtained data of the solution report to the database apparatus 500, and stores the data in the abnormality solution data storage 510 (step S402; storage, storing step, editor). Here, when the identification information is not applied to the solution report, the controller 410 may apply the identification information to the solution report. Then, the controller 410 ends the report registration process FIG. 6 is a flowchart showing a control procedure of the controller 10 (CPU 11) in the image quality inspection control process executed in the image forming apparatus 100.

In the image forming apparatus 100, the image quality inspection control process is called and started before starting to form a large number of the same image or each time a predetermined number of sheets is formed. The process can be started based on a predetermined input operation when the person in charge realizes an image quality abnormality by sight while forming a large number of the same image. With this, it is possible to reduce the cost and the time necessary when the formed image including the failed portion is thrown out or the image forming is performed again.

The controller 10 (CPU 11) obtains the image data of the image forming target and performs the process according to the driving operation of the forming operator 60 (step S101). The controller 10 controls the forming operator 60 to form the image of the target image (step S102). The controller 10 controls the image reader 70 to read the image formed on the recording medium and generates the imaging data (step S103).

The controller 10 compares the imaging data and the target image data and detects the portion in which there is a difference as the abnormality (step S104). The controller 10 generates the abnormality detection image data 22 extracting the portion of the difference (step S105).

The controller 10 determines whether there is an abnormality as a result of the abnormality detection (step S106). When it is determined that there is no abnormality ("NO" in step S106), the controller 10 ends the image quality inspection control process. As shown in the file A in the display screen W1, the controller 10 may perform predetermined output showing that there is no abnormality before the process ends.

When it is determined that there is an abnormality ("YES" in step S106), the controller 10 performs a suitable display on the display 51 showing that there is an abnormality and waits until the person in charge finishes handling the abnormality. The controller 10 determines whether the handling of the abnormality is finished (step S107). For example, when there is input on the operation receiver 52 that the handling of the abnormality is finished or the instruction to perform the image forming operation of the same image again is obtained, the controller 10 determines that the handling of the abnormality is finished. When it is determined that the handling of the abnormality is not finished ("NO" in step S107), the controller 10 repeats the process in step S107.

When it is determined that the handling of the abnormality is finished ("YES" in step S107), the controller 10 controls the forming operator 60 to perform the image forming operation again based on the image forming target data held at present (step S108). The controller 10 controls the image reader 70 to read the formed image and generates the imaging data (step S109). The controller 10 compares the imaging data after handling the abnormality and the target image data, and detects the abnormality (step S110).

The controller 10 determines whether there is an abnormality as a result of the detection (step S111). When it is determined that there is an abnormality ("YES" in step S111), the process of the controller 10 returns to step S107. When it is determined that there is no abnormality ("NO" in step S111), the controller 10 switches the screen to the screen to perform request for input of the solution report, and requests authentication information regarding the editing of the solution report (step S112). The process switching to the process in step S112 may be limited to only when the operation button B2 is pressed on the input screen W3.

The controller 10 waits for the input of the authentication information, and determines whether the authentication is performed normally (whether the editing is received) (step S113; second authentication). When it is determined that the authentication is not performed normally ("NO" in step S113), the controller 10 ends the image quality inspection control process.

When it is determined that the authentication is performed normally ("YES" in step S113), the controller 10 controls the display 51 to display the input screen of the solution report (step S114). The controller 10 may reflect the input contents on the display in the display screen as necessary. Then, the controller 10 determines whether the operation showing that the input is finished is received (step S115). When it is determined that it is received ("YES" in step S115), the present display contents are discarded and the image quality inspection control process ends.

When it is determined that the operation showing the input is finished is not received ("NO" in step S115), the controller 10 determines whether the operation to register the input contents is received (step S116). When it is determined that the registration operation is not received ("NO" in step S116), the process of the controller 10 returns to step S115. When it is determined that the registration operation is received ("YES" in step S116), the controller 10 transmits to the server apparatus 400 the contents that are input on the new input screen as new solution report data (step S117). When the communication connection between the image forming apparatus 100 and the server apparatus 400 is cut when the registration operation is received, the transmitting target data is temporarily stored and held, and at the suitable timing after connection is resumed, the data is transmitted to the server apparatus 400. When the data is exported as described above, the data can be transmitted from the terminal apparatus 300 connected to the server apparatus 400 again to the server apparatus 400 at the suitable timing after editing the output data.

As described above, since the server apparatus 400 collectively manages the information regarding how to solve the image quality abnormality in the image forming apparatus 100, it is possible to prevent the knowledge scattering and the knowledge can be easily used.

Next, the use of the aggregated solution report is described.

FIG. 7A and FIG. 7B are diagrams describing the display of the solution report.

As described above, in the screen displaying the abnormality detection images as a list, when the operation button B1 showing "view" in the solution column is selected and operated, the image forming apparatus 100 requests output of the list of the solution report regarding the abnormality similar to the target abnormality detection image data 22 to the server apparatus 400, and the display showing the list can be obtained.

When the solution report is displayed (output from the server apparatus 400), the authentication can be requested similarly as when the solution report is created or edited. The authentication information here can be different from the authentication information when the solution report is created or edited, and can be open widely to those who may handle the abnormality. For example, the following may be able to view the solution report, unskilled maintenance vendors such as new employees who do not create the solution report or a person in charge of reception (person who does not handle the abnormality) that receives the inquiry by telephone from the user and displays as a list on the terminal apparatus 300 at hand. The solution report may be widely used by the user and/or the manager of the image forming apparatus 100. Alternatively, from the image forming apparatus 100, the solution can be viewed freely without input of the authentication information by the user.

When the operation button B1 is selected and operated, the display screen displays the display screen W4 showing as a list the solution procedure corresponded to the abnormality detection image similar to the obtained abnormality detection image. In FIG. 7A, 17 search results can be displayed by scrolling. In this case, the degree of similarity may be evaluated quantitatively, and the degree of similarity can be displayed as a list in order from those with a high degree of similarity. A list (list data) of the solution report showing the degree of similarity in order from those with the high degree of similarity can be output as initial data from the server apparatus 400 or the display order can be replaced freely on the display side such as the image forming apparatus 100. As described above, the search result can be further narrowed based on the type of the image forming apparatus 100 or the type of recording medium which are option items, and the display order can be rearranged.

In the display screen W4 displaying the list, the abnormality detection image F3 corresponding to the solution report extracted in the search and an excerpt of the solution procedure are displayed. On the right side of the display screen, the abnormality detection image F2 regarding the abnormality occurring at present in the image forming apparatus 100 is also displayed. Therefore, it is easy to select the abnormality detection image F3 similar to the above.

In each solution report, the operation button B3 showing "details" is displayed. By selecting and operating any of the operation buttons B3, the detailed contents of the selected solution report are displayed. The operation button B2 showing "edit" is displayed in the display screen W4 showing the display as a list but the operation of the operation button B2 can be received only when the present image quality abnormality is solved.

As shown in FIG. 7B, in the display screen W5 showing the detailed contents, the contents input on the input screen W3 of the solution report are displayed. The person in charge of handling the abnormality confirms the contents and determines whether the solution report is suitable. When it is difficult to determine which of the solution reports positioned in the top ranking of the list is suitable, the solution report can be displayed in order by selecting and operating the operation button B4 showing "before" and the operation button B5 showing "next". When it is determined that none of the solution reports can be applied to the present abnormality, the display can be canceled by pressing the operation button B6 showing "cancel" and an attempt to solve the abnormality may be made by the person handling the abnormality on his own.

The operation button B7 showing "print" may be displayed on the display screen W5. By selecting and operating the operation button B7, the displayed contents of the resolution report are converted to data of image forming, and the image of the data is formed and output by the forming operator 60 of the image forming apparatus 100. Depending on the abnormality, the electric power supply to the image forming apparatus 100 needs to be stopped temporarily when handling the abnormality, and during this period, the abnormality cannot be handled while looking at the contents displayed on the display 51. By forming an image and outputting the solution procedure, the handling can be performed while looking at the output medium. The abnormality of the image quality may occur in such output, but in this case, as long as the contents can be understood, the abnormality is not a problem.

When it is determined which solution report corresponds to the present image quality abnormality, the person in charge of handling the abnormality determines whether the abnormality can be handled on the spot by himself by considering the difficulty and the replacement components. The person in charge of handling the abnormality can contact the person who is at the level that can handle the abnormality or can obtain the replacement components as necessary. As described above, since the range in which the input can be made is smaller than the range that the solution report can be viewed, if the level of the person who is to handle the abnormality is not displayed in the difficulty, the display is to be adjusted to suggest that it is recommended that the user of the image forming apparatus 100 himself should handle the abnormality even if the user is not used to the image forming apparatus 100 or to suggest the level of the skilled maintenance vendor to be called.

When the person in charge of reception for assistance selects the solution report, the person in charge of the reception can determine whether to describe the solution to the user (person who is asking for assistance) and allow the user to handle the abnormality or to allow the person in charge with the level of skill to be able to solve the abnormality to handle the abnormality and be the person in charge. That is, in this case, it is possible to promptly assign the operation to the person in charge with the suitable level of technique and knowledge. Therefore, it is possible to avoid unnecessary assignments from one person to another and to prevent excess burden on the skilled person.

FIG. 8A and FIG. 8B are diagrams describing a display of similar cases when an abnormality of the image quality occurs in the image forming apparatus 100.

FIG. 8A is a diagram describing the transmitting and receiving of data performed when the abnormality of the image quality occurs in the image forming apparatus 100. FIG. 8B is a flowchart showing a control procedure by the controller 410 which controls the similar case search process executed in the server apparatus 400.

When the display is performed on the terminal apparatus 300, similar to the example shown in FIG. 5A, the terminal apparatus 300 may directly access to the image forming apparatus 100, or the terminal apparatus 300 may access to the server apparatus 400 and request information regarding the abnormality of the image quality in the image forming apparatus 100.

When the display showing that the abnormality of the image quality is detected and the request from the person in charge for the solution report to solve the abnormality similar to the detected abnormality of the image quality is obtained, the abnormality detection image data 22 and the request for a search of the solution report regarding the abnormality with a pattern similar to the abnormality detection image is transmitted from the image forming apparatus 100 to the server apparatus 400.

The server apparatus 400 accesses to the database apparatus 500 and performs the process to search for the abnormality with a pattern similar to the abnormality detection image. For example, the search process may be performed by various image processes, but the process time may become long if the process of comparison is performed between the presently obtained abnormality detection image data and all of the stored abnormality detection image data each time a request is made. Therefore, a feature amount is quantified based on a feature amount in advance, for example, a multi-dimension vector. According to the degree of similarity of the numeric value (relative distance between the multi-dimension vectors, for example), the abnormality detection image with a pattern similar at a predetermined reference or more is extracted, and the solution report corresponding to the abnormality detection image is extracted. The display data regarding the display contents in the image forming apparatus 100 or the terminal apparatus 300 is generated and output by the server apparatus 400 in a predetermined format, and the received display data is simply displayed on the image forming apparatus 100 or the terminal apparatus 300.

The person in charge selects and operates the case which is determined to correspond to the present image quality abnormality from the display contents (corresponding cases). When the operation of selection is received on the image forming apparatus 100 or the terminal apparatus 300, the detailed display of the selected corresponding case is performed on the display. All of the data for the detailed display can be obtained in advance from the server apparatus 400 together with the data displayed as a list. Alternatively, the display data which is requested from the image forming apparatus 100 or the terminal apparatus 300 to the server apparatus 400 and is generated by the server apparatus 400 is obtained and displayed by the image forming apparatus 100 or the terminal apparatus 300.

When the abnormality is handled, the image forming apparatus 100 performs the confirmation to solve the abnormality. The flow regarding the creating of the solution report hereinafter can be switched to the flow shown in FIG. 5A.

As described above, the similar case search process shown in FIG. 8B starts when the search request in response to the selecting and operating of the operation button B1 is received with the abnormality detection image data as necessary from the image forming apparatus 100 or the terminal apparatus 300.

When the similar case search process starts, the controller 410 (CPU) of the server apparatus 400 obtains the abnormality detection image data (step S411). The controller 410 analyzes the abnormality detection image data and quantifies the feature (calculates the feature amount) (step S412).

The controller 410 accesses to the database apparatus 500, and compares the feature amount of the corresponding image and the calculated feature amount among the stored and registered solution reports. The solution report with a difference (Euclidian distance in a multi-dimensional amount, angle difference in a unit vector) within a predetermined range (that is, similar to each other) are extracted (selected) (step S413; selector). The controller 410 determines the order of the list by arranging the order from the value of the difference between the feature amount of the abnormality detection image data and the feature amount regarding the extracted solution reports being small. The controller 410 generates the display data in a list according to the above order in a predetermined format (step S414). Here, the controller 410 may also generate the data for detailed display of the extracted solution reports.

The controller 410 outputs the data for display regarding the generated abnormality solution data to the image forming apparatus 100 or the terminal apparatus 300 which made the request (step S415, outputter). Then, the controller 410 ends the similar case search process.

FIG. 9 is a flowchart showing a control procedure by the controller 10 of the image quality inspection control process when the above described process regarding the display and the selection of the solution report is included.

In this image inspection control process, the process in steps S130 to S142 are added to the image quality inspection control process shown in FIG. 6, and the process in step S106 is switched to the process in step S106a. The processes in steps S112, S113, S115, and S116 among the processes in steps S112 to S117 are included in the later-described report editing control process (see FIG. 10) shown as step S142, and the processes in steps S114 and S117 are switched to the processes of steps S114a and S117a in the report editing control process. The other contents of the process are the same as both control processes. The same reference numerals are applied to the processes with the same contents, and the detailed description is omitted.

Following the process in step S105, the controller 10 (CPU 11) displays the display screen W1 regarding the list of the abnormality detection result (step S130). The display right after the inspection does not need to be a list of all of the abnormality detection images and the target images for which the detection result is stored, and only the display regarding the target image which is inspected is to be performed. Regarding the image including the abnormality, the controller 10 displays the operation button B1 showing "view" together with the operation button B2 showing "edit". Then, the process by the controller 10 proceeds to step S106.

When it is determined that there is an abnormality in the determining process in step S106 and the process proceeds to "YES", the controller 10 determines whether the display regarding the solution of the contents of the detected abnormality is selected, that is, whether the operation of the operation button B1 regarding the target image is received (step S131). When it is determined that it is not received ("NO" in step S131), the process of the controller 10 proceeds to step S140.

When it is determined that it is received ("YES" in step S131), the controller 10 requests the password regarding the display of the solution (step S132). The controller 10 can request the ID for authentication in addition to the passwords. The controller 10 determines whether the authentication is performed normally (determines whether the output is possible) (first authenticator; step S133). When it is determined that the authentication is not performed normally ("NO" in step S133), the process of the controller 10 proceeds to step S140.

When it is determined that the authentication is performed normally ("YES" in step S133), the controller 10 transmits to the server apparatus 400 the abnormality detection data including the abnormality detection image data 22, and requests a search for a similar image quality abnormality and the solution report of the abnormality (step S134). The controller 10 waits for the reply from the server apparatus 400 and obtains the search result included in the reply. The controller 10 controls the display 51 and displays a list of the search report and the corresponding abnormality detection image based on the search result (step S135). Then, the process by the controller 10 proceeds to step S107.

When it is determined in the process in step S107 that the abnormality is not handled and the process progresses to "NO", the controller 10 determines whether the selection operation (selection operation of the operation button B3) of any of the solution reports is received (step S136). When it is determined that it is not received ("NO" in step S136), the process by the controller 10 returns to step S107.

When it is determined that the operation to select the solution report is received ("YES" in step S136), the controller 10 performs the detailed display of the selected solution report (step S137). The controller 10 determines whether the print instruction to print the detailed display contents of the solution report is received (step S138).

When it is determined that it is not received ("NO" in step S138), the process of the controller 10 returns to step S107.

When it is determined that it is received ("YES" in step S138), the controller 10 converts the detailed display contents of the solution report to data for forming the image (operation as the converter), forms the image with the forming operator 60, and outputs the image (step S139). Then, the process by the controller 10 proceeds to step S140.

Before the processes proceed to the process in step S107 or step S140, the power supply to the image forming apparatus 100 may be temporarily stopped. After returning from the pause, the process can be resumed automatically from the process in step S140. In this case, the screen displayed when resumed can be any display screen among the display screens W1, W4, and W5.

The process regarding the operation of the operation buttons B4 to B6 is omitted above, but the process can be suitably added.

When the process proceeds to step S140, the controller 10 determines whether the handling of the abnormality is performed (step S140). The determination can be performed with the same process as the process in step S107. When it is determined that the handling of the abnormality is not performed ("NO" in step S140), the controller 10 repeats the process in step S140. When it is determined that the abnormality is handled ("YES" in step S140), the process by the controller 10 proceeds to step S108.

After the process in steps S108 to S110, when it is determined that there is an abnormality in the determination process in step S111 ("YES" in step S111), the process by the controller 10 returns to step S133. The determination process when the process returns to step S133 may first be performed based on the result according to the authentication information requested by the step S132, and the reception of the input of the authentication and the confirmation process do not have to be performed again.

When it is determined in the determination process in step S111 that there is no abnormality and the process proceeds to "NO", the controller 10 determines whether the operation regarding the editing request of the solution report, that is, whether the selection and operation of the operation button B2 is performed (step S141). As shown in FIG. 7A, the operation button B2 may be regarding the editing of the solution report already registered or may be for newly registering the solution report as shown in FIG. 3.

When it is determined that the operation of the selection of the operation button B2 is not performed ("NO" in step S141), the controller 10 ends the image quality inspection control process. When it is determined that the selection and operation of the operation button B2 is performed ("YES" in step S141), the controller 10 calls and executes the report editing control process (step S142).

Figure 10:
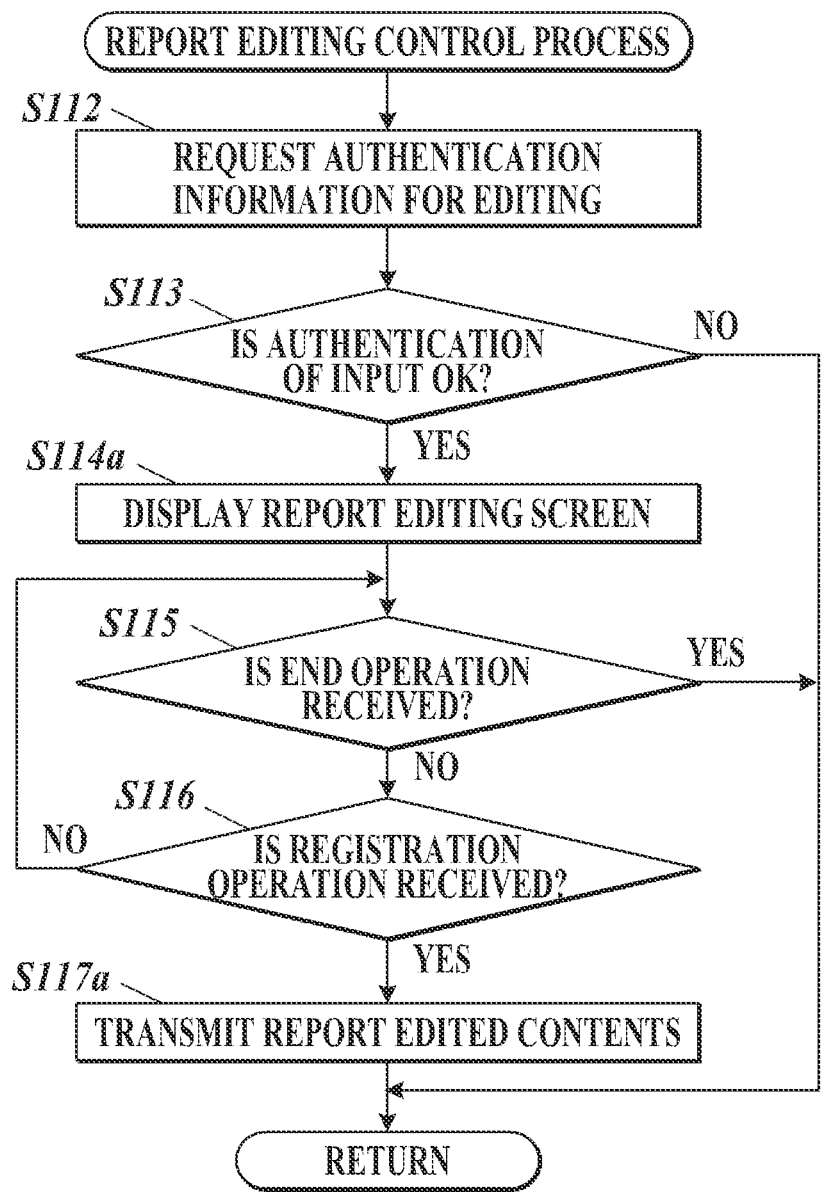
FIG. 10 is a flowchart showing a control procedure of a report editing control process.

FIG. 10 is a flowchart showing a control procedure of the report editing control process. As described above, the process in steps S112, S113, S115, and S116 in the report editing control process are the same as the contents of the process in the image quality inspection control process shown in FIG. 6, and the detailed description is omitted. In the determining process in step S112, if the authentication information is the same as the authentication information authenticated in step S133, and the authentication ID includes the authority to edit, there is no need to request the input of the authentication information again.

In the determining process in step S113, when it is determined that the normal authentication is performed ("YES" in step S113), the controller 10 displays the editing screen of the solution report corresponding to the selected operation button B2 (step S114a). When the editing screen of the newly registered solution report is displayed, as shown in FIG. 4B, the controller 10 displays the input screen W3 in which all of the input items are blank. When the controller 10 displays the editing screen of the solution report already registered, the editing screen is displayed in a state in which the registered contents are filled in the entry column.

In the determining process in step S116, when it is determined that the registration operation of the solution report is received, the controller 10 transmits the edited data of the solution report to the server apparatus 400 (step S117a). The controller 10 may select and transmit only the data of the edited items. The controller 10 may automatically generate and add the history data. The history data may be generated in the server apparatus 400. Then, the controller 10 ends the report editing control process, and returns the process to the image quality inspection control process.

As described above, the server apparatus 400 and the database apparatus 500 are included in the image forming system 1 as the abnormality handling data aggregating system according to the present embodiment. The server apparatus 400 includes the controller 410 and the database apparatus 500 includes the abnormality solution data storage 510 which stores the abnormality solution data. The controller 410 functions as the obtainer and obtains the handling information to solve the image quality abnormality occurring in the image forming apparatus 100 and the abnormality detection image data 22 regarding the output image including the image quality abnormality by the image forming apparatus 100 corresponded to each other as the abnormality solution data. The abnormality solution data storage 510 stores the abnormality solution data obtained by the server apparatus 400.

As described above, by storing and managing the trouble occurring in the image forming apparatus 100, specifically, centrally storing and managing the solution information regarding the abnormality of the image quality in the large number of image forming apparatuses 100 existing in various places, the necessary information when the image quality abnormality occurs can be found and used. Therefore, according to the abnormality handling data aggregating system (image forming system 1), it is possible to swiftly obtain without a burden the solution to solve the abnormality of the image quality occurring in the image forming apparatus 100.

The controller 410 of the server apparatus 400 functions as the selector and compares the abnormality detection image data 22 regarding the output image including the image quality abnormality generated in the image forming apparatus 100 and the abnormality image data included in the abnormality solution data stored in the abnormality solution data storage 510, and selects the abnormality solution data regarding the image quality abnormality similar to each other. The controller 410 of the server apparatus 400 functions as the outputter and outputs the selected abnormality solution data to the image forming apparatus 100 and the terminal apparatus 300 which requested the abnormality solution data.

The server apparatus 400 includes such search ability, and it is possible to easily assume the reason and handle the abnormality at the site where the problem is occurring or the person in charge receiving the request for advice from the sight. The similarity degree is determined based on the image data of the abnormality which actually occurred in the image quality. Therefore, a large amount of abnormality solution data throughout different types of image forming apparatuses can be referred, and it is possible to reduce the possibility that the necessary information cannot be obtained.

Moreover, the abnormality detection image data 22 is data of the image extracting the portion where the abnormality of the image quality is detected from the output image of the recording target image in the image forming apparatus 100. That is, the information of the original output image is deleted, and the determination of the degree of similarity can be performed without variation based on only the information such as contents and position of the abnormality. Moreover, the comparison among images is easy. The contents of the original target of forming is not disclosed to a third party and therefore, security is safe and secured.

The solution report includes information regarding the solution procedure of the image quality abnormality. With this, the person in charge of maintenance is to perform the process according to the described procedure, and the handling becomes easy.

The solution report includes the information regarding the site where the abnormality of the image quality occurred. The handling of the abnormality becomes easy by clearly showing the site where the abnormality occurred in the image forming apparatus with a large number of components.

The solution report includes a description regarding the problems of the image forming apparatus in which the image quality abnormality occurs. By clarifying why the problem occurs, it becomes clear what kind of process should be performed with what kind of purpose in the process which is the core of the solution procedure. Therefore, it is possible to reduce the increase of the burden caused by the insufficient handling.

The solution report includes the precautions in the handling of the abnormality. The image forming apparatus includes many fine components, and voltage and heat is emitted to apply and fix the color material. Therefore, there are many dangers such as electric shock, burn, stain, and loss of components. Moreover, depending on the position of replacing the components, tools may become necessary. By calling for attention in advance, it is possible to solve the abnormality of the image quality safely and reliably by one occasion of handling the abnormality.

The controller 410 functions as the outputter, and when the plurality of abnormality solution data is selected, the list data arranging the abnormality solution data is output in order from those with the degree of similarity among the contents of the abnormality of the image quality being high. Similar abnormality of the image quality may occur among different reasons, and in such abnormality detection images, the person in charge of maintenance needs to select the suitable abnormality detection image, and there may be a burden if all of the solution reports are confirmed. Those with a high possibility are positioned with priority at the high ranks in the display of the list. Therefore, the person in charge can quickly find the abnormality determined to match with the present abnormality of the image quality, and the burden of confirming the remaining solution reports can be cut.

As the first authenticator, the image forming system 1 performs the authentication which determines whether the output can be performed in response to the output request of the solution report from outside. Such information does not have to be completely open to the public, and may be open to only those in charge such as the user or the maintenance vendor coping with the image forming apparatus. Therefore, by performing the authentication request when the request for the information is made, the suitable information can be provided. The authentication is not limited to the access from the image forming apparatus 100, and the access from the typical terminal apparatus 300 can be suitably managed and controlled.

The image forming system 1 functions as the editor and is able to receive the editing of the solution report stored by the abnormality solution data storage 510. Here, the image forming system 1 functions as the second authenticator and may determine whether the editing of the solution report can be received. According to the above, it is possible to prevent mixing of low quality handling and dangerous information such as handling by his own by those who are outsiders or those who have little knowledge, and it is possible to output the suitable information more securely. Moreover, it is possible to edit according to the situation such as the situation changing by modification of the product after registering, adding the information when a certain description is forgotten or a more suitable solution procedure becomes clear. With this, it is possible to prevent the registration performed first becoming old and becoming useless quickly. Moreover, at the same time, it is possible to prevent old and unnecessary information from being retrieved and output.

The information regarding the difficulty of the solution procedure is included in the solution report. When the difficulty is lower than the predetermined reference, output suggesting that the abnormality can be handled by the user of the image forming apparatus 100 is performed. That is, there is no need to call the maintenance vendor more than necessary and the burden of the maintenance vendor is decreased. Moreover, the amount of time that the image forming apparatus 100 is stopped until the maintenance vendor handles the problem can be shortened, and the operation efficiency is enhanced.

When the difficulty is higher than the predetermined reference, output suggesting that a request to handle the abnormality should be made to a specialist. Contrary to the above example, in a case in which a component needs to be replaced and it is difficult for a typical user with little knowledge and skill to handle the abnormality, it is possible to prevent the user from wasting time, to prevent accidents occurring or prevent further damage to the image forming apparatus 100. Moreover, by quickly contacting the staff who can handle the abnormality, it is possible to efficiently and suitably assign the handling of the abnormality to the maintenance vendor.

The controller 10 of the image forming apparatus 100 operates as the converter which converts the solution report (may or may not include the abnormality detection image) output by the server apparatus 400 to the data for forming the image. By converting to the data for forming the image and forming the image with the forming operator 60, the person in charge is able to suitably handle the abnormality while looking at the sheet which is printed out even when the electric power supply to the image forming apparatus 100 is cut when the maintenance process is performed.

The abnormality handling data aggregating method according to the present embodiment includes an obtaining step to obtain as abnormality solution data a solution report to solve the abnormality of the image quality occurring in the image forming apparatus 100 corresponded with the abnormality detection image data regarding the output image included in the image quality abnormality by the image forming apparatus 100, and a storing step in which the obtained abnormality solution data is stored.

As described above, by aggregating the abnormality solution data regarding the abnormality image quality of the image forming apparatus and storing the abnormality solution data, the person at the site where the abnormality of the image quality is occurring is able to perform the most suitable determination swiftly. With this, the person who is able to handle the abnormality efficiently is able to suitably handle the abnormality.

The program 421 according to the present embodiment allows the computer to function as an obtainer which obtains as the abnormality solution data the solution report to solve the abnormality of the image quality occurring in the image forming apparatus 100 corresponded with the abnormality detection image data regarding the output image including the abnormality of the image quality in the image forming apparatus 100, and the storage which stores the obtained abnormality image data.

As described above, the program is installed in the normal program and controlled, so that the solution information of the abnormality of the image quality in a large number of image forming apparatuses can be aggregated through the internet easily without the necessity of a special configuration. As a result, when a new image quality abnormality occurs in the image forming apparatus, the information based on the abnormality of the image quality occurring in the past can be easily obtained from the aggregated information, and the handling can be performed without unnecessary trouble.

The present invention is not limited to the above embodiments and various changes are possible.

For example, according to the above embodiment, in the display screen showing the abnormality detection result as a list, the output image and the abnormality detection are displayed aligned, but the display of the output image does not have to be performed for the display other than the recent result.

According to the present embodiment, the solution report can be printed out but alternatively, the solution report can be converted to a format which can be displayed as an image on the terminal apparatus 300, for example. For example, the solution report can be converted to PDF data and the abnormality can be handled while looking at the PDF data without forming an image on a sheet.

According to the present embodiment, it is determined whether the typical user is able to handle the abnormality according to difficulty. Alternatively, whether the typical user is able to handle the difficulty does not need to be determined by difficulty. For example, when dedicated tools or replacement components are necessary, the procedure may be easy but problems may occur if the typical user handles the abnormality. Therefore, when setting whether the typical user is able to handle the abnormality is determined, the setting can be made without considering difficulty. Moreover, the typical user does not have to know the degree of the skill needed by the person in charge of maintenance handling the abnormality. Therefore, the information can be shown by an expression which can only be understood among the maintenance vendors.

In addition to the above difficulty, an input item different from the input item of the solution report shown in the embodiment can be determined, or some of the input items can be omitted within the range that the image quality abnormality can be solved. When the solution procedure does not fit in the input column, the area for input can be suitably scrolled and displayed. In this case when the page is printed, the shape is formed to be able to print the entire input column easily.

According to the present embodiment, the degree of similarity is calculated based on the feature amount of the abnormality detection image. Alternatively, the degree of similarity can be calculated comparing a more typical parameter such as difference in the color in the abnormality, shape and size of the area where the abnormality occurred, and the shape and size of each abnormality. The numeric value showing the calculated degree of similarity can also be clearly shown on the display screen W4. The comparison does not have to be among the calculated feature amounts and the abnormality detection image data can be directly compared.

According to the present embodiment, in response to the request from the image forming apparatus 100 and the terminal apparatus 300, the server apparatus 400 performs the search by comparing the abnormality detection image data, and the solution report including the abnormality similar to the obtained abnormality detection image data is output in reply to the request. Alternatively, simply, a remote access can be made from the terminal apparatus 300 to the server apparatus 400, and the person in charge can search for the solution report including the similar abnormality. In this case, an index can be added to each solution report so that the direct search can be performed easily. Alternatively, direct access can be made from the terminal apparatus 300 to the database apparatus 500, and the search process can be performed.

According to the above embodiment, a portion of the solution procedure is displayed on the display screen W4 of the list showing the searched and extracted solution report. Alternatively, the contents of the problem and the site where the abnormality occurred can be displayed.

According to the present embodiment, the abnormality handling data aggregating system includes at least a server apparatus 400 and a database apparatus 500, and further includes an image forming apparatus 100 and terminal apparatuses 200 and 300. However, the configuration is not limited to the above. For example, the abnormality solution data storage 510 of the database apparatus 500 may be a storage included in the server apparatus 400 or the storage attached externally as a peripheral device. That is, the abnormality handling data aggregating system may be a single server apparatus 400. Alternatively, for example, an intermediate server apparatus which relays the communication can be positioned between the server apparatus 400 and the other devices including the image forming apparatus 100 and the terminal apparatuses 200 and 300. The server apparatus 400 is not limited to one apparatus and a plurality of server apparatuses may operate parallel in a distributed state.

The search request and display for similar cases can be performed at the same time and parallel in the image forming apparatus 100 and the terminal apparatus 300. The switching of the display and the selection of the candidate can be performed separately. The editing and registering of the solution report after solving the abnormality can be controlled to be exclusive so that only one device is able to perform the process.

According to the above embodiment, the image forming apparatus is an electro-photographic type, but the image forming apparatus may be an image forming apparatus which performs the image forming operation using another method.

According to the above description, the storage 420 includes a nonvolatile memory such as HDD, SSD, flash memory as a computer-readable storage medium which stores the program 421 regarding the abnormality handling data aggregating control according to the present invention. However, the storage is not limited to the above. As the computer-readable storage medium, other nonvolatile memory such as MRAM or a portable storage medium such as a CD-ROM or a DVD disk can be applied. A carrier wave can be applied as the medium which provides data of the program regarding the present invention through communication wires.

Other than the above, the specific configuration and the contents and procedures of the processing operation according to the above embodiment can be suitably modified without leaving the scope of the present invention. The scope of the present invention includes the scope of the invention as defined in the attached claims and its equivalents.

Although embodiments of the present invention have been described and illustrated in detail, the disclosed embodiments are made for purposes of illustration and example only and not limitation. The scope of the present invention should be interpreted by terms of the appended claims.

What is claimed is:

1. An abnormality handling data aggregating system comprising:
   a storage storing a plurality of pieces of abnormality solution data, each of the pieces of abnormality solution data including (i) abnormality image data regarding an output image including an image quality abnormality occurring in an image forming apparatus, and (ii) handling information for solving the image quality abnormality associated with the abnormality image data to which the handling information corresponds, and the abnormality image data being stored in association with its corresponding handling information; and
   a hardware processor configured to:
      compare (i) obtained abnormality image data regarding an acquired output image in which it is detected that an image quality abnormality exists with (ii) at least one of the plurality of pieces of abnormality solution data stored in the storage;
      select, from among the plurality of pieces of abnormality solution data stored in the storage, at least one piece of abnormality solution data having a similar image quality abnormality as the image quality abnormality detected to exist in the obtained abnormality image data; and
      output the selected at least one piece of abnormality solution data,
   wherein:
   the handling information includes information guiding a user of the image forming apparatus to perform a maintenance process on the image forming apparatus or replacement of a component of the image forming apparatus, and
   the hardware processor, in response to selection of a plurality of pieces of abnormality solution data, outputs list data arranging the selected plurality of pieces of abnormality solution data in order starting from the abnormality solution data whose image quality abnormality has a high degree of similarity with the image quality abnormality of the obtained abnormality image data.

2. The abnormality handling data aggregating system according to claim 1, wherein the abnormality image data is data of an image in which a detected portion of the image quality abnormality is extracted from the output image.

3. The abnormality handling data aggregating system according to claim 1, wherein the handling information includes information regarding a procedure to solve the image quality abnormality.

4. The abnormality handling data aggregating system according to claim 1, wherein the handling information includes information regarding a site in which the image quality abnormality occurred.

5. The abnormality handling data aggregating system according to claim 1, wherein the handling information includes a description regarding a problem in the image forming apparatus in which the image quality abnormality occurred.

6. The abnormality handling data aggregating system according to claim 1, wherein the handling information includes a precaution to be taken during handling.

7. The abnormality handling data aggregating system according to claim 1, wherein the hardware processor determines whether an output can be made in reply to an output request of the handling information from outside.

8. The abnormality handling data aggregating system according to claim 1, wherein:
the hardware processor receives editing of the handling information stored in the storage, and
the hardware processor determines whether the editing can be received.

9. The abnormality handling data aggregating system according to claim 1, wherein:
the handling information includes information regarding a procedure which solves the image quality abnormality and information regarding a difficulty of the procedure, and
the hardware processor performs output which suggests that the image quality abnormality can be handled by the user of the image forming apparatus when the difficulty is lower than a predetermined standard.

10. The abnormality handling data aggregating system according to claim 1, wherein:
the handling information includes information regarding a procedure to solve the image quality abnormality and information regarding a difficulty of the procedure, and
the hardware processor performs output which suggests that a request to a skilled person in charge should be made to handle the image quality abnormality when the difficulty is higher than a predetermined standard.

11. The abnormality handling data aggregating system according to claim 1, wherein the hardware processor converts the output handling information to data for forming an image.

12. The abnormality handling data aggregating system according to claim 1, wherein the hardware processor is configured to output the selected at least one piece of abnormality solution data such that the handling information included therein is output in association with its corresponding abnormality image data.

13. The abnormality handling data aggregating system according to claim 12, wherein the hardware processor is configured to simultaneously display the handling information and its corresponding abnormality image data in association with each other.

14. The abnormality handling data aggregating system according to claim 1, wherein the hardware processor is configured to output the list data in association with the obtained abnormality image data.

15. The abnormality handling data aggregating system according to claim 14, wherein the hardware processor is configured to simultaneously display the list data and the obtained abnormality image data in association with each other.

16. The abnormality handling data aggregating system according to claim 1, wherein the hardware processor is configured to:
calculate a feature amount of the image quality abnormality in the obtained abnormality image data,
calculate a difference between the feature amount calculated with respect to the obtained abnormality image data and a feature amount calculated with respect to the at least one of the plurality of pieces of abnormality solution data, and
select, as the at least one piece of abnormality solution data, abnormality solution data from among the at least one of the pieces of abnormality solution data with respect to the which the calculated difference is within a predetermined range.

17. An abnormality handling data aggregating method comprising:
storing a plurality of pieces of abnormality solution data in a storage, each of the pieces of abnormality solution data including (i) abnormality image data regarding an output image including an image quality abnormality occurring in an image forming apparatus, and (ii) handling information for solving the image quality abnormality associated with the abnormality image data to which the handling information corresponds, and the abnormality image data being stored in association with its corresponding handling information;
comparing (i) obtained abnormality image data regarding an acquired output image in which it is detected that an image quality abnormality exists with (ii) at least one of the plurality of pieces of abnormality solution data stored in the storage;
selecting, from among the plurality of pieces of abnormality solution data stored in the storage, at least one piece of abnormality solution data having a similar image quality abnormality as the image quality abnormality detected to exist in the obtained abnormality image data; and
outputting the selected at least one piece of abnormality solution data,
wherein:
the handling information includes information guiding a user of the image forming apparatus to perform a maintenance process on the image forming apparatus or replacement of a component of the image forming apparatus, and
the outputting comprises, in response to selection of a plurality of pieces of abnormality solution data, outputs list data arranging the selected plurality of pieces of abnormality solution data in order starting from the abnormality solution data whose image quality abnormality has a high degree of similarity with the image quality abnormality of the obtained abnormality image data.

18. A non-transitory computer-readable storage medium storing a program executable to control a computer to perform processes comprising:
storing a plurality of pieces of abnormality solution data in a storage, each of the pieces of abnormality solution data including (i) abnormality image data regarding an output image including an image quality abnormality occurring in an image forming apparatus, and (ii) handling information for solving the image quality abnormality associated with the abnormality image data to which the handling information corresponds, and the abnormality image data being stored in association with its corresponding handling information;

comparing (i) obtained abnormality image data regarding an acquired output image in which it is detected that an image quality abnormality exists with (ii) at least one of the plurality of pieces of abnormality solution data stored in the storage;

selecting, from among the plurality of pieces of abnormality solution data stored in the storage, at least one piece of abnormality solution data having a similar image quality abnormality as the image quality abnormality detected to exist in the obtained abnormality image data; and outputting the selected at least one piece of abnormality solution data, wherein:

the handling information includes information guiding a user of the image forming apparatus to perform a maintenance process on the image forming apparatus or replacement of a component of the image forming apparatus, and the outputting comprises, in response to selection of a plurality of pieces of abnormality solution data, outputs list data arranging the selected plurality of pieces of abnormality solution data in order starting from the abnormality solution data whose image quality abnormality has a high degree of similarity with the image quality abnormality of the obtained abnormality image data.

* * * * *